United States Patent
Solbrack et al.

(10) Patent No.: US 9,409,459 B2
(45) Date of Patent: Aug. 9, 2016

(54) 4-WAY LEVELING

(71) Applicants: Pape' Machinery, Inc., Eugene, OR (US); Hanson Worldwide, Inc., Spokane, WA (US)

(72) Inventors: Dennis R. Solbrack, Colfax, WA (US); Christopher E. Wood, Spokane, WA (US); Cody Murdock, Spokane, WA (US); Jeffrey Solbrack, Colfax, WA (US)

(73) Assignee: Papé Machinery, Inc., Eugene, OR (US)

( * ) Notice: Subject to any disclaimer, the term of this patent is extended or adjusted under 35 U.S.C. 154(b) by 0 days.

(21) Appl. No.: 14/332,933

(22) Filed: Jul. 16, 2014

(65) Prior Publication Data

US 2015/0021866 A1   Jan. 22, 2015

Related U.S. Application Data

(60) Provisional application No. 61/856,413, filed on Jul. 19, 2013.

(51) Int. Cl.
*B60G 17/015* (2006.01)
*B60G 17/019* (2006.01)
*B60G 15/06* (2006.01)
*B60G 17/0165* (2006.01)

(52) U.S. Cl.
CPC ............ *B60G 17/015* (2013.01); *B60G 15/067* (2013.01); *B60G 17/0165* (2013.01); *B60G 17/01908* (2013.01); *B60G 2202/40* (2013.01); *B60G 2204/421* (2013.01); *B60G 2300/07* (2013.01); *B60G 2400/0512* (2013.01); *B60G 2500/30* (2013.01); *B60G 2800/912* (2013.01)

(58) Field of Classification Search
CPC .. B60G 17/00; B60G 17/015; B60G 17/0165; B60G 17/01908; B60G 15/067; B60G 2202/40; B60G 2204/421; B60G 2300/07; B60G 2400/0512; B60G 2500/30; B60G 2800/912

See application file for complete search history.

(56) References Cited

U.S. PATENT DOCUMENTS

| | | | | | |
|---|---|---|---|---|---|
| 4,266,627 | A | * | 5/1981 | Lauber | B60G 17/00 180/8.3 |
| 4,397,473 | A | * | 8/1983 | Miles | B60G 5/04 280/124.102 |
| 4,600,069 | A | * | 7/1986 | Oswald | B60K 17/32 180/24.02 |
| 4,760,686 | A | * | 8/1988 | Samejima | A01D 34/74 56/15.8 |
| 4,850,786 | A | * | 7/1989 | Oswald | B66C 19/007 180/208 |
| 5,018,453 | A | * | 5/1991 | Kinard | B60F 1/00 105/72.2 |
| 5,288,101 | A | * | 2/1994 | Minnett | B60G 17/015 267/277 |
| 5,700,025 | A | * | 12/1997 | Lee | B60G 3/265 280/124.135 |
| 5,865,444 | A | | 2/1999 | Kempf et al. | |
| 5,896,731 | A | | 4/1999 | Scheid | |

(Continued)

*Primary Examiner* — Barry Gooden, Jr.

(74) *Attorney, Agent, or Firm* — Timberline Patent Law Group

(57) ABSTRACT

Representative implementations of devices and techniques provide leveling for a vehicle, such as an overland vehicle. A leveling signal is received by a leveling arrangement coupled to the vehicle at a wheel position. The leveling arrangement rotates a rocker plate with respect to the body of the vehicle, changing a location of a wheel coupled to the rocker plate with respect to the body of the vehicle. In an aspect, the leveling signal is based on a first vehicle sensor signal representing a lateral tilt of the vehicle and/or a second vehicle sensor signal representing a pitch angle of the vehicle.

14 Claims, 15 Drawing Sheets

(56) References Cited

U.S. PATENT DOCUMENTS

| | | | | |
|---|---|---|---|---|
| 6,367,831 B1* | 4/2002 | Lim | | B60G 11/08 267/242 |
| 7,416,201 B2* | 8/2008 | Davey | | B60G 3/14 280/124.126 |
| 7,866,671 B2 | 1/2011 | Madler | | |
| 7,914,020 B2* | 3/2011 | Boston | | B60G 3/20 280/124.136 |
| 8,408,559 B1* | 4/2013 | Lee | | B60G 17/016 280/5.508 |
| 9,168,940 B1* | 10/2015 | Leszczak | | A47C 1/10 |
| 2002/0050699 A1* | 5/2002 | Guiet | | B60G 3/14 280/477 |
| 2005/0098975 A1* | 5/2005 | Yun | | B60G 7/006 280/124.127 |
| 2005/0116437 A1* | 6/2005 | Furukawa | | B62K 25/283 280/124.128 |
| 2005/0206149 A1* | 9/2005 | Mulhern | | A61G 5/043 280/755 |
| 2009/0057048 A1* | 3/2009 | Chien | | B60G 17/0162 180/282 |
| 2012/0166043 A1* | 6/2012 | Watson | | B60G 17/015 701/37 |
| 2013/0147140 A1* | 6/2013 | Lee | | B60G 17/0162 280/124.106 |
| 2013/0147141 A1* | 6/2013 | Lee | | B60G 17/0162 280/124.106 |
| 2013/0147142 A1* | 6/2013 | Lee | | B60G 17/0162 280/124.106 |
| 2015/0001829 A1* | 1/2015 | Berthold | | B62K 25/286 280/284 |
| 2015/0291233 A1* | 10/2015 | Dames | | B62D 49/0678 280/638 |

\* cited by examiner

4-WAY LEVELING

PRIORITY CLAIM AND CROSS-REFERENCE TO RELATED APPLICATION

This application claims the benefit under 35 U.S.C. §119(e)(1) of U.S. Provisional Application No. 61/856,413, filed Jul. 19, 2013, which is hereby incorporated by reference in its entirety.

BACKGROUND

Various vehicles or implements that are configured for negotiating sloped terrain (such as hillside combines, excavation and construction equipment, military vehicles, etc.) may use leveling or tilt systems to level at least a portion of the vehicle (such as an operator cabin, a grain storage bin, etc.) while traversing the sloped terrain. Leveling systems can cause a portion of the vehicle to be tilted to produce the leveling desired. For example, one or more axles of a vehicle may be tilted, with one end of the axle extended away from the body of the vehicle while the other end of the axle is more or less fixed or is contracted toward the body of the vehicle. Such leveling systems often include techniques for sensing the slope of the terrain and then compensating for the slope by leveling portions of the vehicle while the vehicle is on the slope.

Many leveling systems have one or more leveling sensors (e.g., clinometers, tilt meters, etc.) that use gravity, for example, for sensing the slope of terrain. Common techniques for sensing a slope include the use of accelerometers, liquid capacitive devices, electronic devices, electrolytic devices, devices that include a gas bubble in a liquid, and pendulum devices. As the leveling sensors indicate the presence of a slope in the terrain being traversed, the leveling systems can compensate as much as they are capable.

Often, a particular leveling system has a limited capability to compensate for a slope being traversed. Also, different leveling system designs have different capabilities and limitations. For example, the tilting of axles, and so forth, can be constrained by the design and construction of the chassis, frame, suspension, drive train, body components, and the like, of the vehicle.

BRIEF DESCRIPTION OF THE DRAWINGS

The detailed description is set forth with reference to the accompanying figures. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions of components shown in the illustrations of the figures are for example and ease of discussion, and other shapes and or dimensions may be used and remain within the scope of the disclosure, unless specified otherwise.

DETAILED DESCRIPTION

Overview

Figure 1:
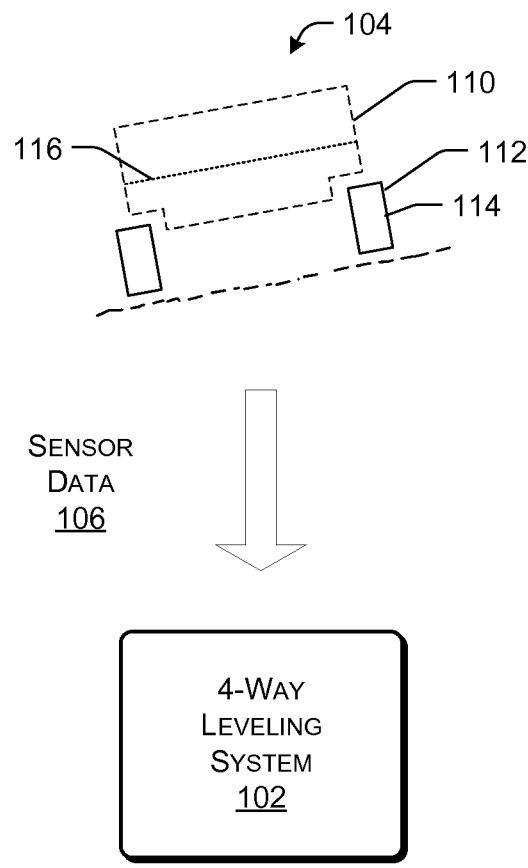
FIG. 1 is a schematic of an example leveling system implemented with respect to a vehicle, in which the techniques and devices in accordance with the present disclosure may be embodied.
Figure 1:
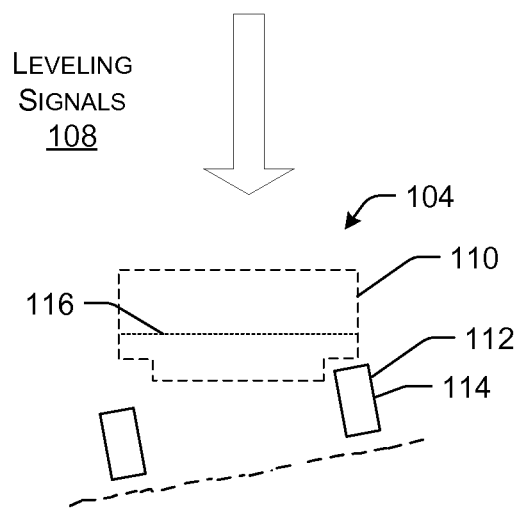

Representative implementations of devices and techniques provide 4-way leveling for a vehicle, such as an overland vehicle. Sensors associated with the vehicle may provide signals representing one or more operating conditions of the vehicle, including forces acting on the vehicle representing a non-level condition of the vehicle, for example. The vehicle can be tilted or leveled based on one or more of the signals from the sensors.

In one aspect, a vehicle that is traversing sloped terrain may be automatically leveled based on signals received from one or more leveling sensors configured to sense the sloped terrain. In alternate implementations, several or many sensors may be used to sense multiple operating conditions of a vehicle. The sensors may be used in various combinations to provide multiple leveling signals. In one example, each wheel of a vehicle may receive an independent leveling signal based on one or more of the multiple signals received from the leveling sensors. In another example, each wheel of the vehicle may be independently leveled (i.e., adjusted, lowered, raised, etc.) based on the vehicle receiving one or more leveling signals.

Various implementations of devices and techniques for vehicle leveling are discussed in this disclosure. The devices and techniques are discussed with reference to example implementations illustrated in the figures. The devices and techniques discussed herein are referred to in the environment of an overland vehicle, such as a hillside combine harvester, for ease of discussion and illustrative convenience. The devices and/or techniques may also be used in other environments, with other implementations, and associated with other vehicles, systems, and the like, to provide leveling. In various embodiments, vehicles and the like may have 4 or more (or less) wheels, and have various combinations of axles and suspensions.

Advantages of the disclosed devices and techniques are varied, and include: 1) independent (4-way) leveling may occur at each wheel location; 2) greater leveling capacity and range over various types of terrain having three-dimensional slopes; 3) pitch and roll leveling provides an ability to maintain key portions of the vehicle in a level state (such as a cleaning shoe on a harvester—to optimize grain capture during separation, and also a grain tank on a harvester—saving potential losses from crop spilling); 4) greater mechanical advantage at the levelling components allows for smaller components to do greater work, or minimizes the risk of overworking the tilting mechanisms, reducing wear and energy loss; 5) maintains better traction of the vehicle and keeps proper vehicle balance; and 6) straight-forward upgrades on existing vehicles can be performed including the use of many existing components and assemblies. Other advantages of the disclosed techniques may also be present.

Implementations are explained in more detail below using a plurality of examples. Although various implementations and examples are discussed here and below, further implementations and examples may be possible by combining the features and elements of individual implementations and examples.

Example Leveling System

FIG. 1 is a schematic of an example leveling system 102 implemented with respect to a vehicle 104, in which the techniques and devices in accordance with the present disclosure may be embodied. It is to be understood that portions of the techniques and/or devices may be implemented as part of the vehicle 104, as an accessory to the vehicle 104, or as part of another system (for example as a remote system to the vehicle 104, etc.). Further, portions of a leveling system 102 may be integrated with the vehicle 104 while other portions are remotely located.

The vehicle 104 of the figures and the disclosure is illustrated and discussed in generic terms and often described in terms of a "hillside combine harvester" device. This is, however, for ease of discussion. The techniques and devices described herein with respect to leveling systems 102 is not so limited, and may be applied to other types of vehicles (e.g., farming equipment, excavation equipment, construction equipment, military vehicles, recreational vehicles, etc.) without departing from the scope of the disclosure. Further, while the illustrated vehicle 104 is shown as a simple vehicle having four wheels, the techniques and devices described herein are intended for implementation with vehicles having single or multiple axles, any number of wheels, and any number of steerable wheels or axles. Vehicles for overland travel are intended embodiments, as well as amphibious vehicles, and the like.

Figure 2:
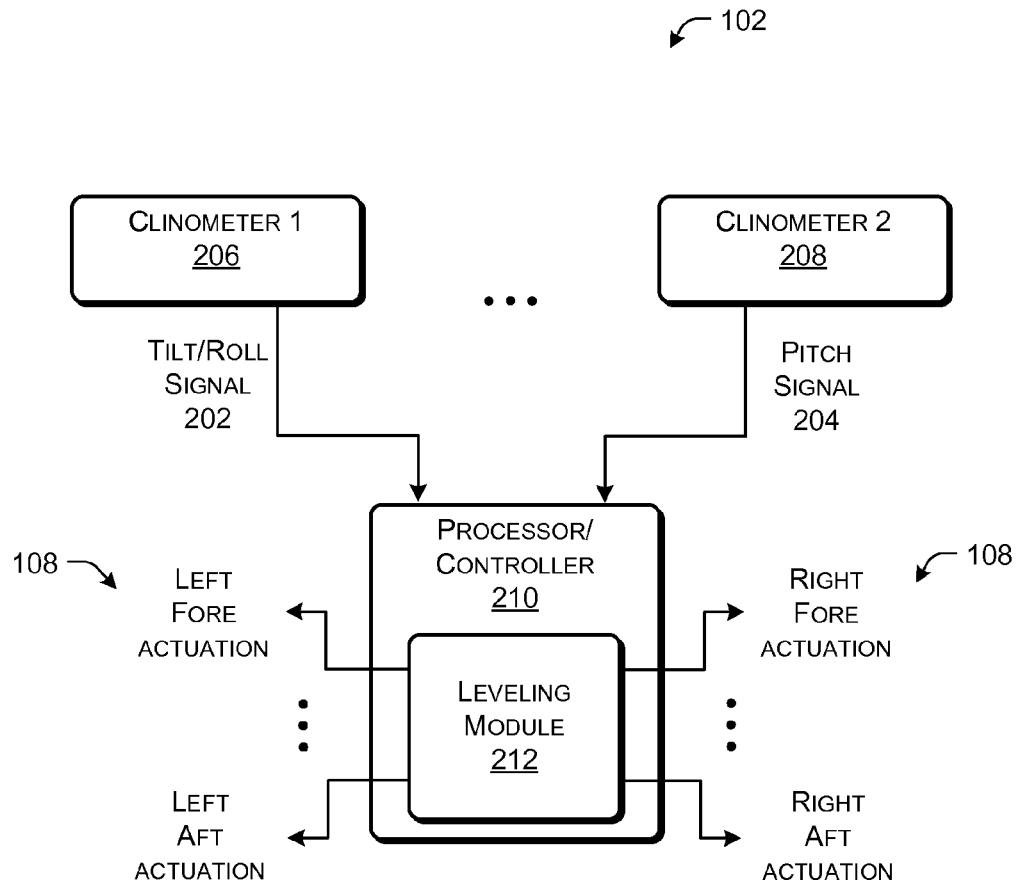
FIG. 2 is a block diagram showing example detail of a leveling system, according to an implementation.

As shown in FIG. 1, an example leveling system 102 may be arranged to receive sensor data 106 from one or more sensors associated with a vehicle 104. For example, as shown in FIG. 2, a vehicle 104 may be leveled by a leveling system 102 based on a first signal 202 representing a lateral force (i.e., tilt, roll) acting on the vehicle 104 and a second signal 204 representing a longitudinal force (i.e., pitch) acting on the vehicle 104. The first 202 and second 204 signals may be sent by one or more vehicle sensors (206, 208) associated with the vehicle 104, and received by a processing or control portion 210 of the leveling system 102, as shown in FIG. 2. In alternate embodiments, the leveling system 102 may use additional signals from additional sensors in combination with one or both of the first and second signals (202, 204) and first and second sensors (206, 208).

The leveling system 102 may be partially or completely implemented using specialized or generic computing equipment (such as one or more processor/controllers 210, for example) coupled to one or more local and/or remote memory devices (not shown). For example, as shown in FIG. 2, a leveling module 212 arranged to control vehicle 104 leveling may be incorporated or integrated with the processor/controller 210, and may be stored within the one or more memory devices.

For instance, in some implementations, the leveling module 212 and the processor/controller 210 may be a single unit. In other examples, the leveling module 212 may be separate from the processor/controller 210, but may communicate with the processor/controller 210. In one embodiment, the leveling system 102 is implemented using a CAN-based architecture. In other embodiments, the leveling system 102 may be based on other computing architectures, protocols, and/or bus systems.

In one embodiment, the system memory (e.g., memory devices) of the leveling system 102 may include stored application programs and system data. In various embodiments, the system memory may also include other modules, components, and the like (e.g., BIOS, controller(s), communication modules, etc.) that are used for performing the functions described herein.

An example leveling system 102 for a vehicle 104 may include a plurality of sensors 206, 208 coupled to the vehicle 104. In other implementations, one or more sensors may be remote to the vehicle 104. Sensors 206, 208 may be arranged to provide information (such as sensor data 106) to the leveling system 102 about the operating environment of the vehicle 104 and/or the state of various vehicle 104 components and systems. In alternate embodiments, additional or other signals may be received by the leveling system 102, for example, to adjust or correct the leveling signals 108, to reduce or prevent erroneous tilting of the vehicle 104, and the like.

For example, in one embodiment, the vehicle sensors 206, 208 are clinometers (inclinometers) configured to indicate a tilt (e.g., pitch, roll, etc.) of the vehicle 104. In other embodiments, the vehicle sensors 206, 208 may comprise one or more of an accelerometer, a gyroscope, a liquid capacitive device, an electrolytic level device, a gas bubble in liquid device, a pendulum device, and the like.

In one embodiment, one or more of the vehicle sensors 206, 208 are arranged to produce a voltage proportional to a measured tilt/slope. In other embodiments, the vehicle sensors 206, 208 are arranged to produce other types of signals, such as optical signals, magnetic signals, alternating signals, digital signals, and the like.

In an implementation, the leveling system 102 may output one or more leveling signals 108 to various leveling components (e.g., leveling arrangements 402) of the vehicle 104 to adjust a height of an individual wheel 112 or a combination of wheels 112 with respect to the body 110 of the vehicle 104. In other words, the leveling arrangements 402 may be arranged to adjust a vertical distance of a center 114 of the wheel(s) 112 from a preselected feature 116 of the body 110 or of the frame of the vehicle 104. For example, the preselected feature 116 may include features such as a mid-line of the body 110, a top of a wheel opening of the vehicle 104, a top of an inside wheel well, a body 110 or frame component of the vehicle 104, and so forth. In the implementation, the preselected feature 116 is located above the center 114 of the wheel(s) 112 when the vehicle 104 is upright. In the implementation, adjusting the vertical distance of various wheel(s) 112 from the preselected feature 116 increases or decreases the ground clearance at the respective wheel(s) 112. Adjusting the vertical distance of various wheel(s) 112 from the preselected feature 116 can level the body 110 of the vehicle 104, notwithstanding the uneven or sloped terrain being traversed.

As shown in the example embodiment of FIG. 2, individual leveling signals 108 (e.g., left fore actuation, right fore actuation, left aft actuation, and right aft actuation) may be output by the leveling module 212 to respective individual leveling arrangements 402 associated with individual wheels 112 of the vehicle 104. For example, a single leveling signal 108 (e.g., left fore actuation, right fore actuation, left aft actuation, or right aft actuation) may be sent to a leveling arrangement 402 at one wheel 112 at the respective location, adjusting the wheel's 112 distance from the body 110 of the vehicle 104 to level the body 110, for example. In an implementation, a single wheel's 112 distance from the body 110 (e.g., the preselected feature 116) may be adjusted without any of the other wheel 112 distances from the body 110 (e.g., the preselected feature 116) changing.

Further, a combination of two or more leveling signals 108 (e.g., left fore actuation, right fore actuation, left aft actuation, and right aft actuation) may be sent to respective leveling arrangements 402 at respective wheels 112 to level the body 110. Using these leveling signals 108 (and any additional leveling signals 108) the body 110 of the vehicle 104 can be uniquely leveled with respect to terrain having varying slopes.

Figure 3:
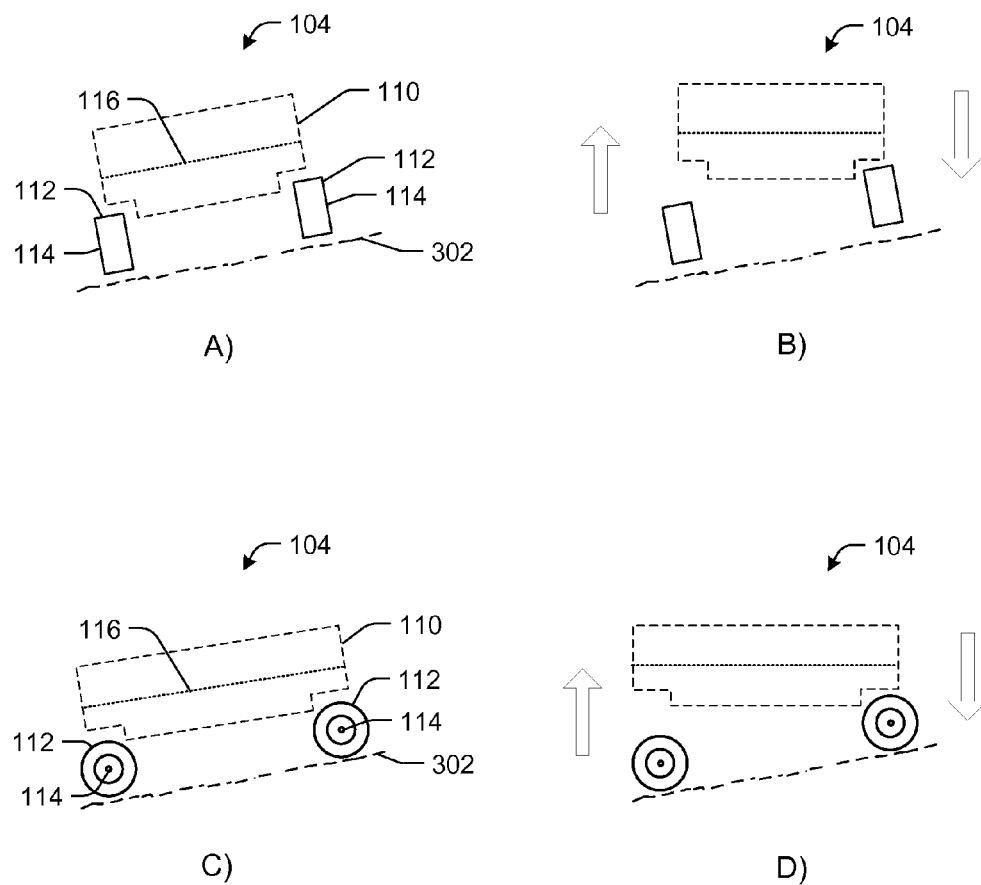
FIG. 3 is a series of illustrations showing implementations of example leveling systems in operation. The illustrations show example responses from the leveling systems, according to an implementation.

For example, as shown in FIG. 3, various leveling adjustments may be performed at individual wheels 112 by individual leveling arrangements 402, based on the terrain 302. As shown in FIG. 3 at diagram A, the vehicle 104 may be on side-hill type sloped terrain 302. In response to lateral (e.g., roll) forces detected by the one or more sensors 206, 208, signals 202, 204 may be sent by the sensors 206, 208 and received by the processor/controller 210. The leveling module 212 may output one or more leveling signals 108, in response to the sensor signals 202, 204 received, to one or more leveling arrangements 402 to level the body 110 of the vehicle 104.

For example, the leveling module 212 may send one or more of the left fore actuation, right fore actuation, left aft actuation, and right aft actuation signals 108 to leveling arrangements 402 at the respective wheel 112 locations so that the distance from one or more of the wheels 112 (e.g., center 114) to the preselected feature 116 on the down-hill side is increased. Additionally or alternately, the leveling module 212 may send one or more of the left fore actuation, right fore actuation, left aft actuation, and right aft actuation signals 108 to leveling arrangements 402 at the respective wheel 112 locations so that the distance from one or more of the wheels 112 (e.g., center 114) to the preselected feature 116 on the up-hill side is decreased. Thus, either individually or in various combinations, adjusting the distance from one or more centers 114 of the wheels 112 to the preselected feature 116 of the body 110 has the effect of leveling the body 110, as shown in FIG. 3 at diagram B.

In another example, as shown in FIG. 3 at diagram C, the vehicle 104 may be on longitudinally sloped terrain 302 (either uphill or downhill). In response to longitudinal (e.g., pitch) forces felt by the one or more sensors 206, 208, signals 202, 204 may be sent by the sensors 206, 208 and received by the processor/control 210. The leveling module 212 may output one or more leveling signals 108, in response to the sensor signals 202, 204 received, to one or more leveling arrangements 402 to level the body 110 of the vehicle 104.

For example, the leveling module 212 may send one or more of the left fore actuation, right fore actuation, left aft actuation, and right aft actuation signals 108 to leveling arrangements 402 at the respective wheel 112 locations so that the distance from one or more of the wheels 112 (e.g., center 114) to the preselected feature 116 on the down-hill side is increased. Additionally or alternately, the leveling module 212 may send one or more of the left fore actuation, right fore actuation, left aft actuation, and right aft actuation signals 108 to leveling arrangements 402 at the respective wheel 112 locations so that the distance from one or more of the wheels 112 (e.g., center 114) to the preselected feature 116 on the up-hill side is decreased. Thus, either individually or in various combinations, adjusting the distance from one or more centers 114 of the wheels 112 to the preselected feature 116 of the body 110 has the effect of leveling the body 110, as shown in FIG. 3 at diagram D.

In one example, both (or all) of the front (fore) wheels 112 of the vehicle 104 may be lowered (or raised) concurrently and/or both (or all) of the rear (aft) wheels 112 may be raised (or lowered) concurrently to level the vehicle 104 while on a longitudinally sloped terrain 302. By way of example, the fore or aft leveling described may achieve 5%-6% leveling by actuating one end (either fore or aft) of the vehicle 104, using the leveling arrangement 402 at each wheel 112 position. Additional leveling may be achieved by actuating both ends of the vehicle 104. In alternate embodiments, lesser or greater leveling percentages may be possible within design constraints of the vehicle 104.

In a further example, the vehicle 104 may be on a hill having lateral and longitudinal components. In response to lateral (e.g., roll) forces and longitudinal (e.g., pitch) forces felt by the one or more sensors 206, 208, signals 202, 204 may be sent by the sensors 206, 208 and received by the processor/control 210. In response to the sensor signals 202, 204 received, the leveling module 212 may output one or more of the left fore actuation, right fore actuation, left aft actuation, and right aft actuation signals 108 to leveling arrangements 402 at the respective wheel 112 locations to adjust the distance from one or more of the wheels 112 (e.g., centers 114) to the preselected feature 116, leveling the body 110 of the vehicle 104.

For example, one or more of the leveling arrangements 402 at some wheel 112 locations may increase the distance from the respective centers 114 of the wheels 112 to the preselected feature 116, and one or more other of the leveling arrangements 402 at other wheel 112 locations may decrease the distance from the respective centers 114 of the wheels 112 to the preselected feature 116, the combination leveling the body 110 of the vehicle 104. Additionally or alternately, one or more of the leveling arrangements 402 at various wheel 112 locations may maintain the current distance from the respective centers 114 of the wheels 112 to the preselected feature 116 as part of the vehicle 104 leveling.

The ability to raise or lower the wheels 112 at one or both ends (fore and aft) of the vehicle 104 as well as lateral (left and right) leveling of the vehicle 104 may be important when harvesting some specialized seed crops, for example. Many harvesters use wind or air currents to separate harvested seed or grain from "material other than grain" or MOG. Often, the air currents are used in conjunction with shaking the materials as they are collected by the harvester.

When there is a significant difference in density between the grain and the MOG, such as with soy beans, wheat, corn, and the like, leveling is important, but it is less critical to keep the harvester (e.g., vehicle 104) as near to level as possible. The denser grain falls into the hoppers and the less dense MOG is blown out of the harvester. However, when there is less difference in density between the grain and the MOG, such as with specialized crops like alfalfa, grass, clover, fescue, mustard, radish, turnip, sugar beet, and the like, it can be more critical to keep the harvester (e.g., vehicle 104) as near to level as possible, both longitudinally and laterally. The separation process may be sensitive to a level condition of the harvester. For example, a non-level or less-level harvester may result in wasted grain that is not captured in the separation process and is spilled or blown out of the harvester, on the "low" side of the vehicle 104, for example.

In other embodiments, the leveling system 102 may receive additional signals representing other aspects of the vehicle 104. In such embodiments, the vehicle 104 is leveled based on a combination of the first 202, second 204, and any additional signals. In alternate embodiments, the vehicle is leveled based on one or more of the first 202, second 204, and any additional signals in various combinations.

In an embodiment, one or more of the first 202, second 204, and any additional signals may be received by the leveling system 102 via a controller area network (CAN) bus infrastructure. In other embodiments, other or additional bus structures, communication techniques (e.g., wired and/or wireless), protocols, and the like, may be used to transmit and receive sensor signals (i.e., the first 202, second 204, and any other signals, etc.) to and from the leveling system 102. Further, in various embodiments, multiple other sensors and associated signals may be used in a leveling system 102 for leveling a vehicle 104.

In an implementation, the automatic leveling provided by the leveling module 212 may be canceled. In the implementation, the vehicle 104 operator may have access to controls for one or more of the leveling arrangements 402 at one or more of the wheel 112 locations. In an example, the operator may manually adjust the distance from one or more of the wheels 112 (e.g., centers 114) to the preselected feature 116, by manually sending one or more of the left fore actuation, right fore actuation, left aft actuation, and right aft actuation signals 108 (and any other actuation signals) to the leveling arrangements 402 at the respective wheel 112 locations.

In various implementations, the operator may adjust the distance from one or more of the wheels 112 to the preselected feature 116 of the body 110 for leveling the vehicle 104, or for other purposes. For example, the operator may wish to manually extend or retract one or more of the wheels 112 while the vehicle 104 is stationary (e.g., for inspection, maintenance, repair, etc.) or while travelling (e.g., for temporary ground clearance, load shifting, traction, etc.).

Example Embodiments

Figure 4:
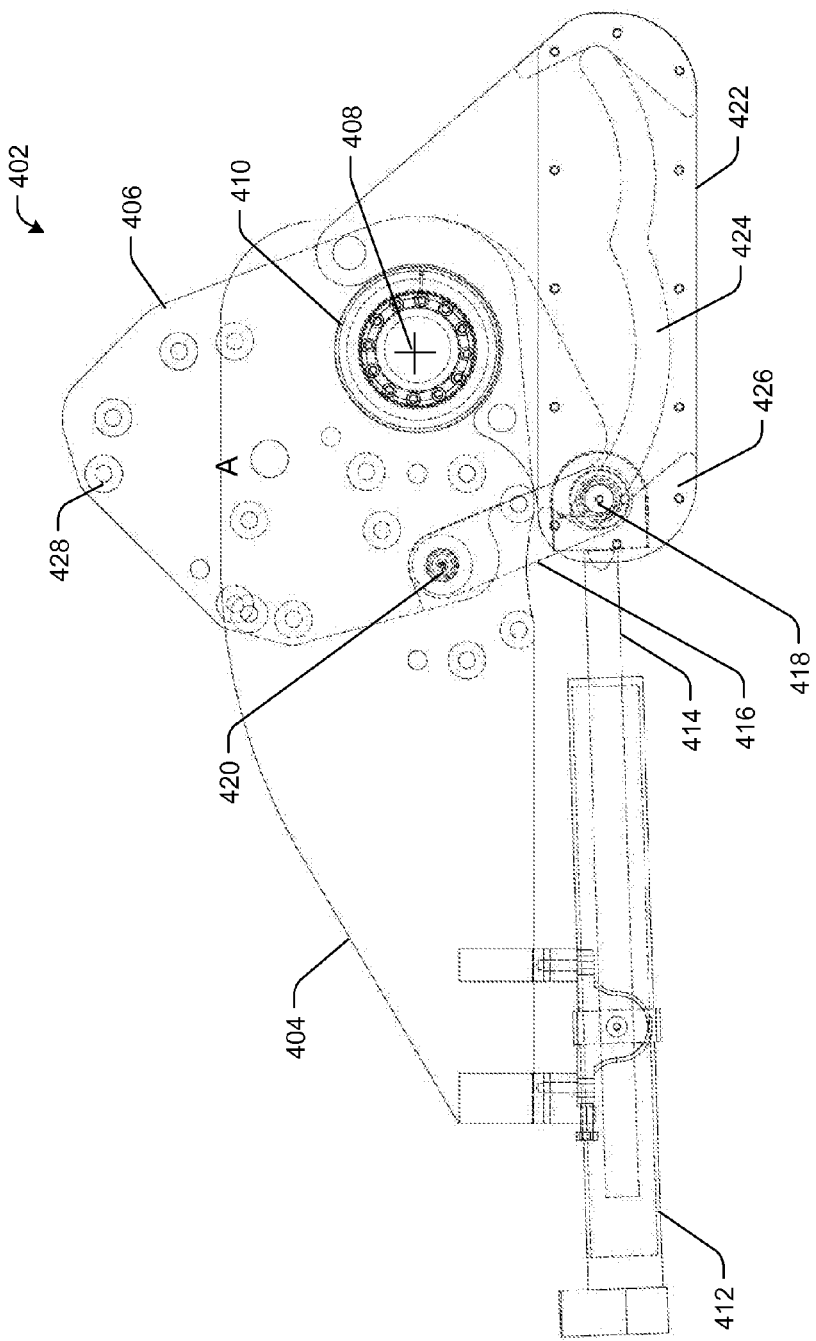
FIG. 4 is a profile view of an example leveling arrangement, showing some detail of the components of the leveling arrangement while in a retracted state, according to an embodiment.
Figure 5:
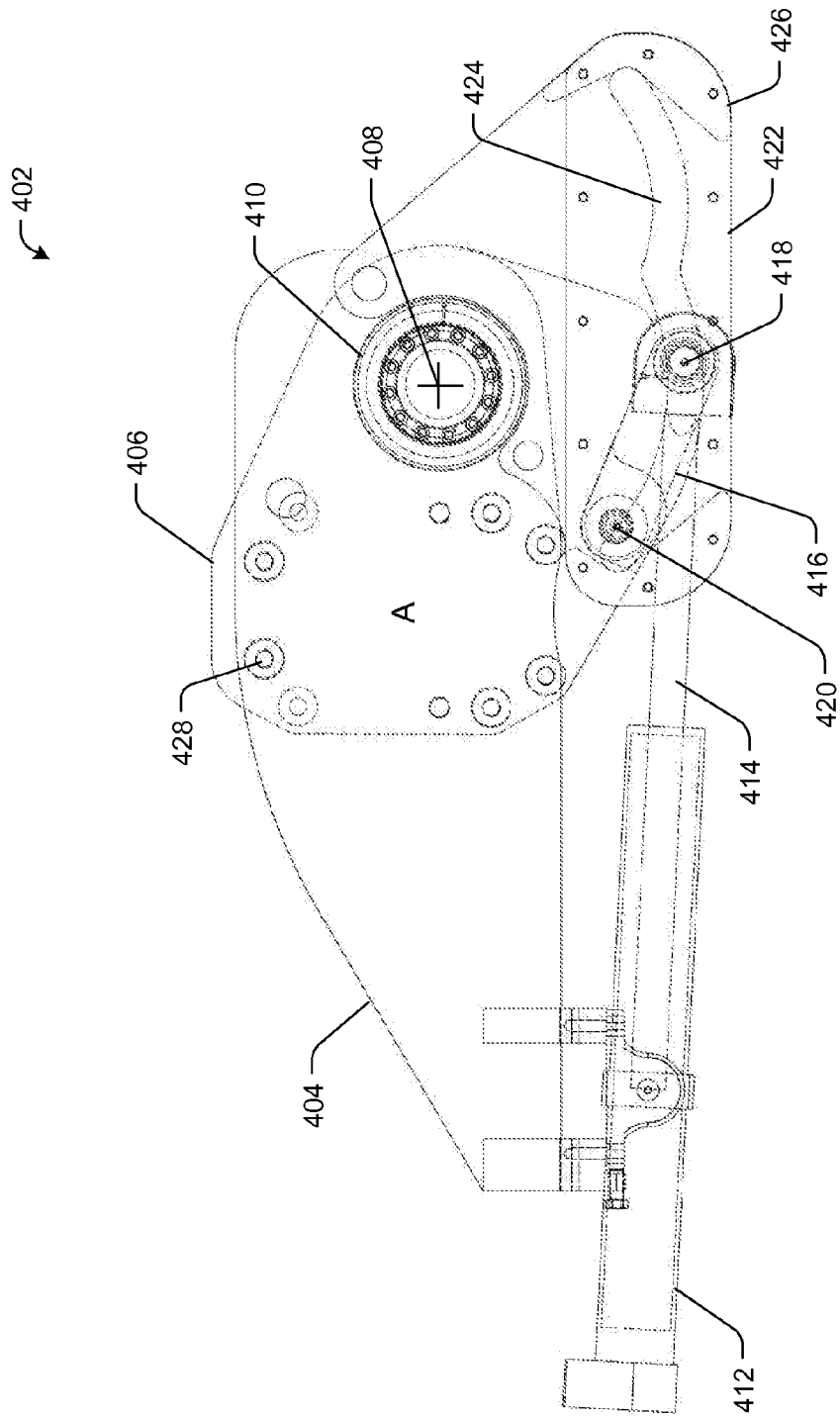
FIG. 5 is a profile view of the example leveling arrangement of FIG. 4, showing some detail of the components of the leveling arrangement while in a neutral state, according to an embodiment.
Figure 6:
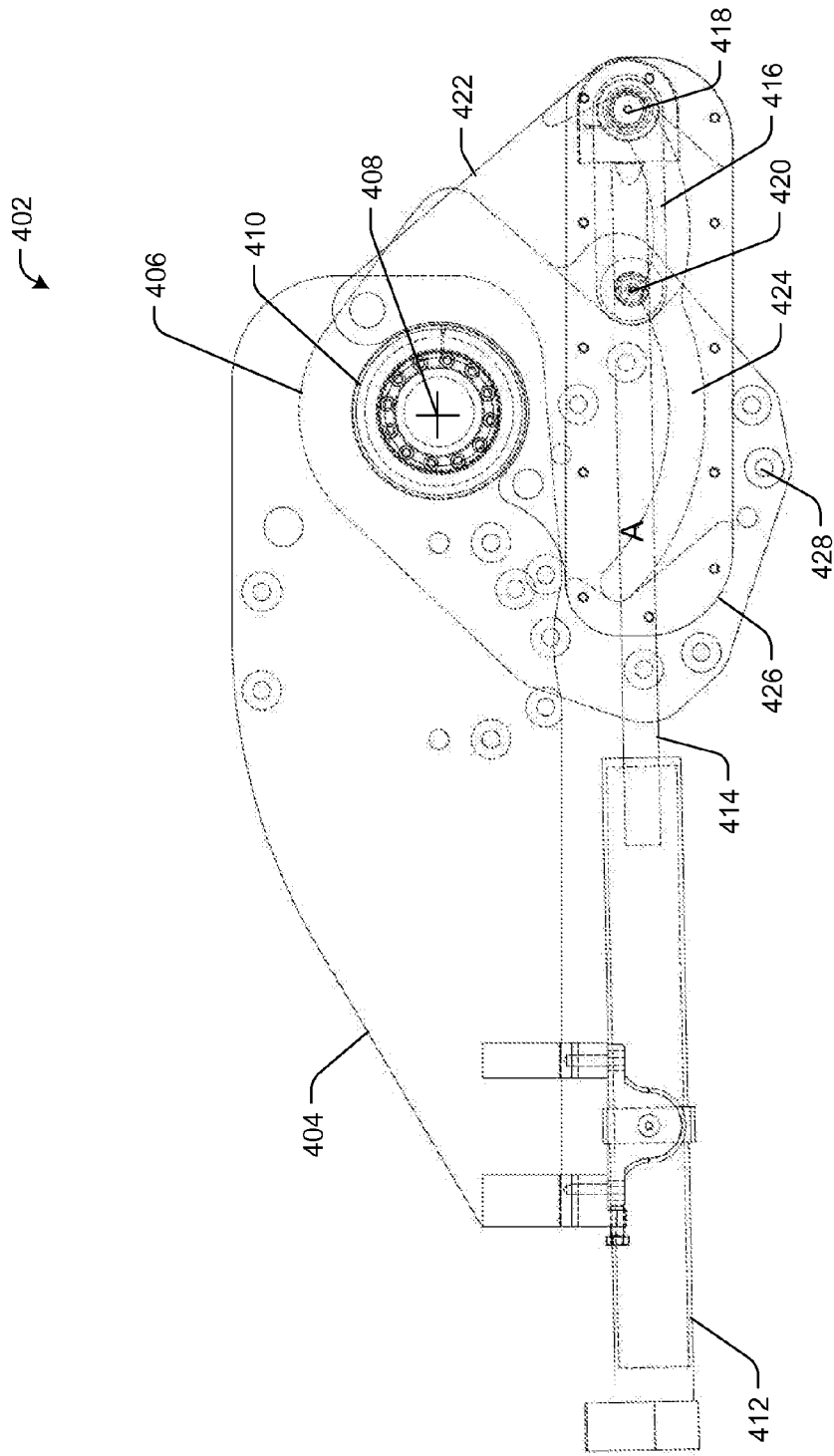
FIG. 6 is a profile view of the example leveling arrangement of FIG. 4, showing some detail of the components of the leveling arrangement while in an extended state, according to an embodiment.
Figure 7:
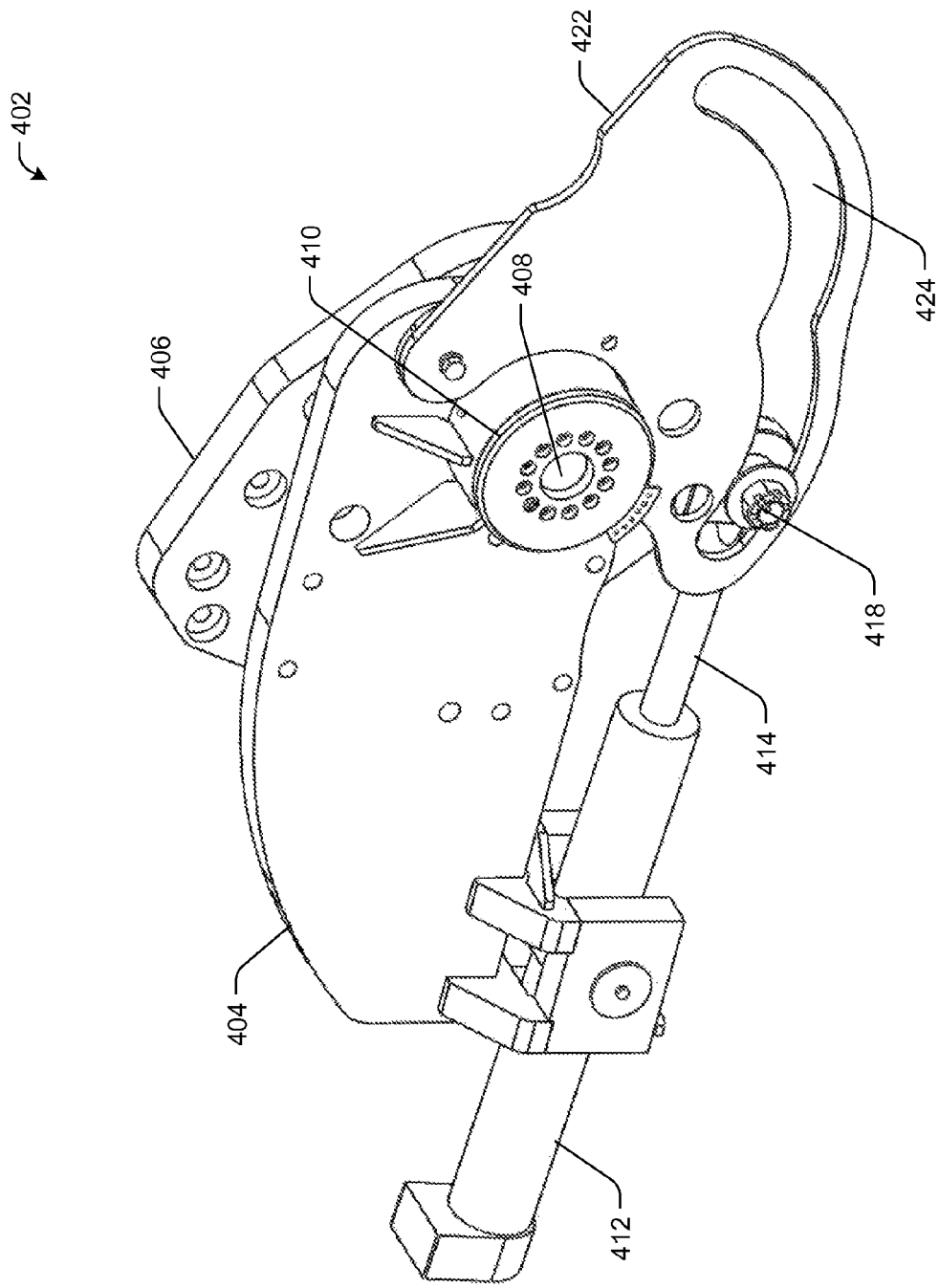
FIG. 7 is a perspective view of an example leveling arrangement, according to an embodiment.
Figure 8:
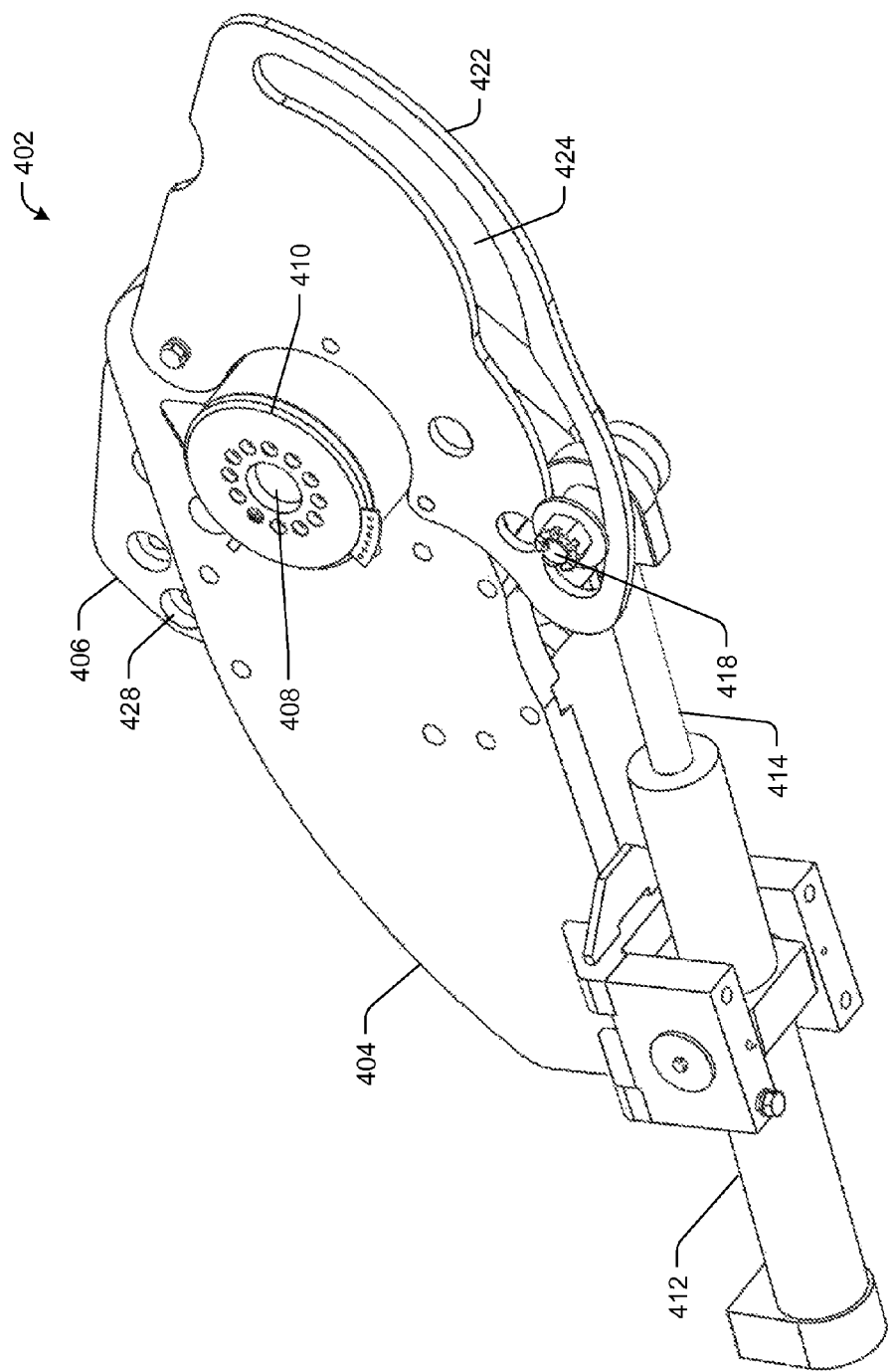
FIG. 8 is another perspective view of an example leveling arrangement, according to an embodiment.
Figure 11:
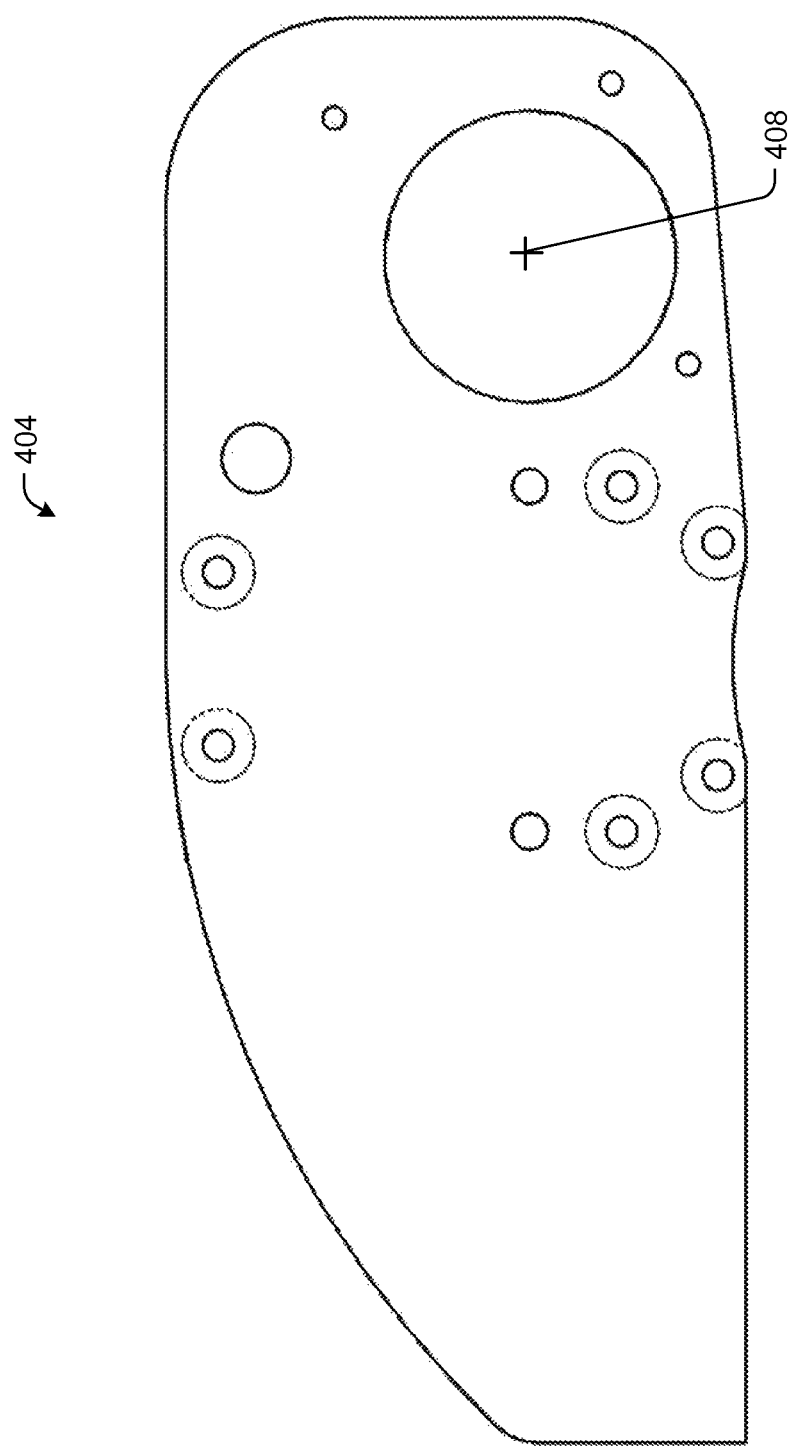
FIG. 11 is a profile view of an example support plate of a leveling arrangement, according to an embodiment.
Figure 12:
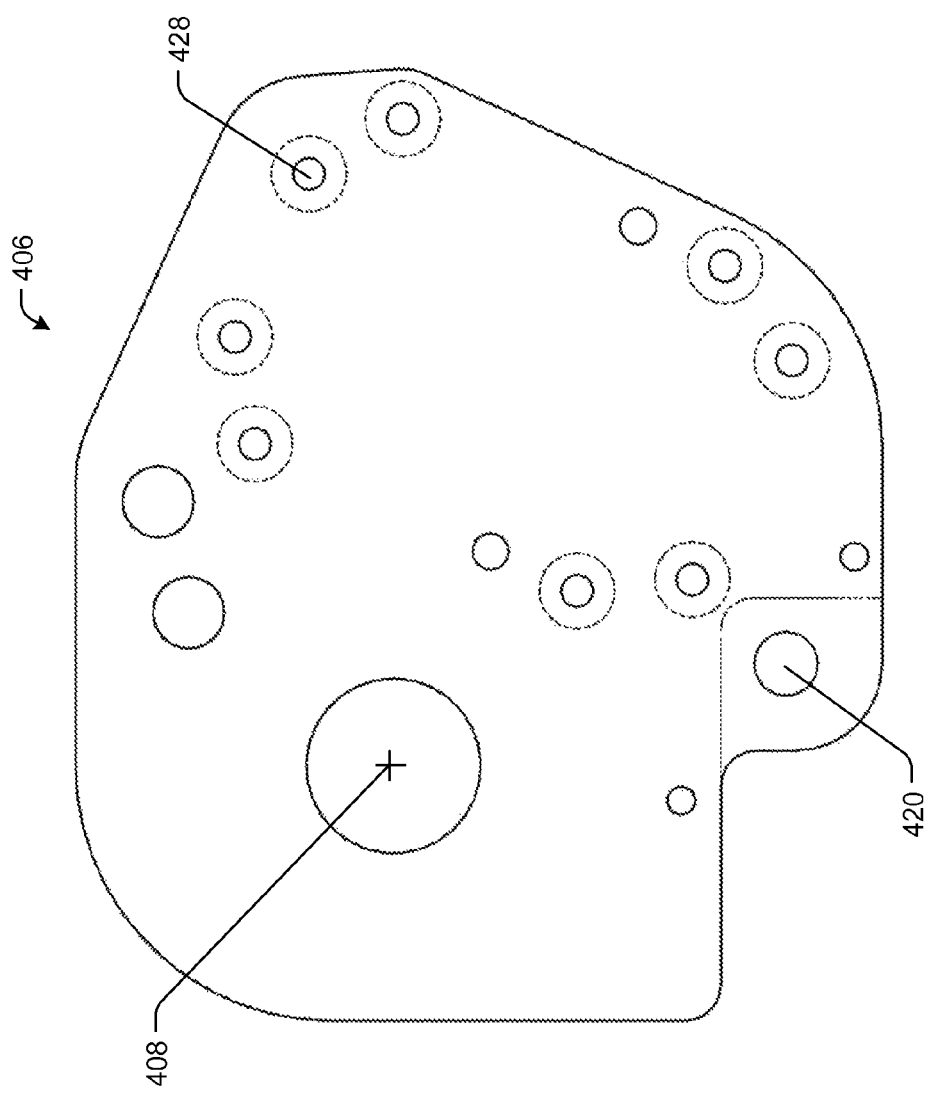
FIG. 12 is a profile view of an example rocker plate of a leveling arrangement, according to an embodiment.
Figure 13:
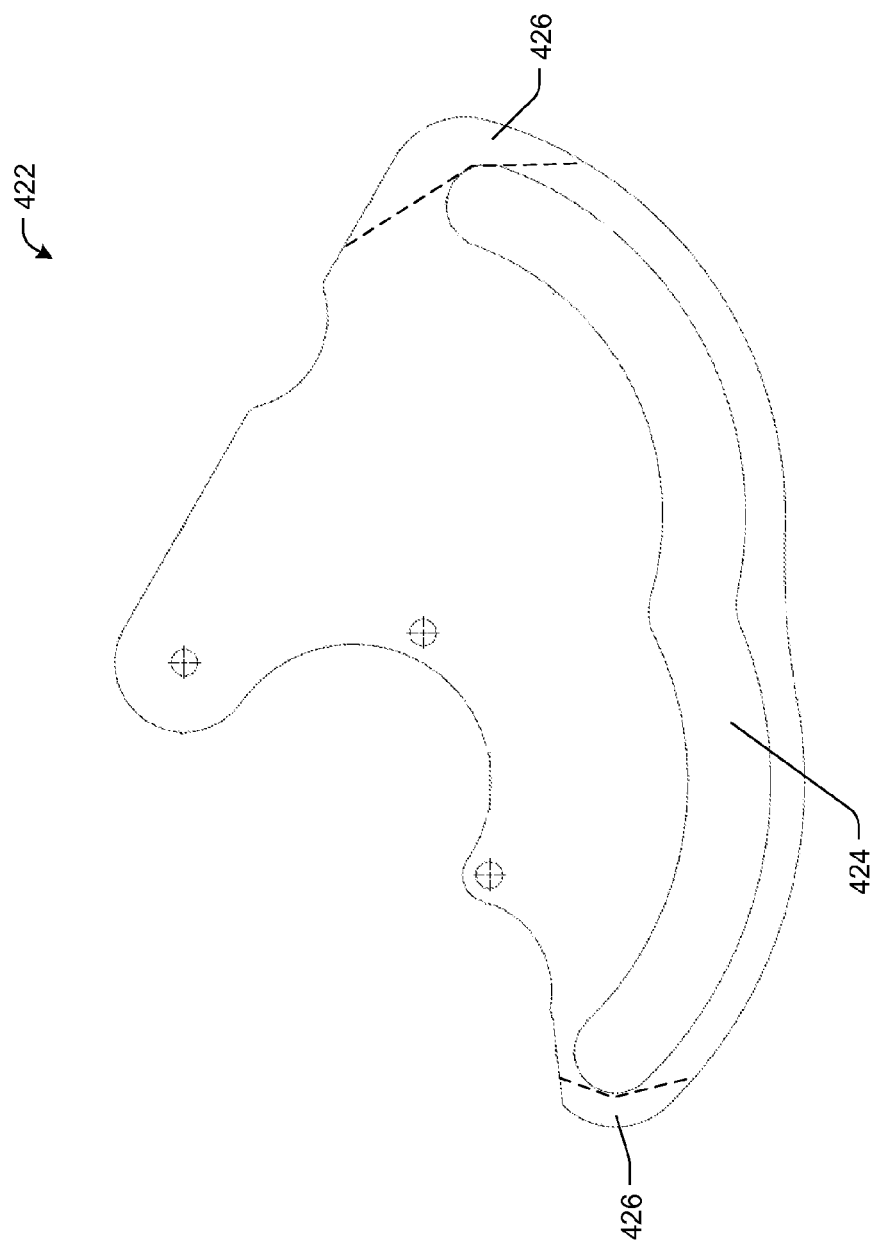
FIG. 13 is a profile view of an example guide plate of a leveling arrangement, according to an embodiment.

FIGS. 4-6 illustrate profile views of an example leveling arrangement 402, showing some detail of the components of the leveling arrangement 402 while in a retracted state, a neutral state, and an extended state, respectively, according to an embodiment. FIGS. 7-10 are perspective views of the example leveling arrangement 402, illustrated from various viewpoints to show detail. Additionally, FIGS. 11-13 show detailed profile views of an example support plate 404, rocker plate 406, and guide plate 422, respectively. The foregoing figures are referred to as "the figures" in the following discussion of an example leveling arrangement 402.

As shown in the figures, an example leveling arrangement 402 may include a support plate 404 and a rocker plate 406. The support plate 404 can be coupled to the frame or body 110 of the vehicle 104, so as to be stationary with respect to the body 110. The rocker plate 406 may be rotationally coupled to a wheel 112 of the vehicle 104 and pivotally coupled to the support plate 404 at a pivot point 408. In various examples, the pivot point 408 may include a bearing, a drive train component 410, a combination of the same, or the like. In one example, the pivot point 408 includes the output of the transmission of the vehicle 104.

In an example, the rocker plate 406 is rotationally coupled to a wheel 112 at a first rotational axis, indicated by an "A" in the figures. The axis "A" and the pivot point 408 may be offset some preset distance, the distance determining the extent of height adjustment available at the wheel 112. Accordingly, the location of the axis "A" may be selected or determined by the desired leveling range and by any constraints of the vehicle 104 design.

For example, the rocker plate 406 pivots with respect to the support plate 404, at the pivot point 408, during leveling. As it does, the axis "A" rotates at least partially around the pivot point 408. For example, the axis "A" may move from a higher extent above the pivot point 408 as shown in FIG. 4, (thereby reducing a distance from the center 114 of the wheel 112 to the preselected feature 116 of the vehicle 104 and lowering the body 110 of the vehicle 104/reducing the ground clearance of the body 110 at that wheel 112 location); through a neutral position where the axis "A" is somewhat level with the pivot point 408 as shown in FIG. 5, (thereby achieving or maintaining a "normal" or level grade ride height and ground clearance of the body 110 at that wheel 112 location); to a lower extent below the pivot point 408 as shown in FIG. 6, (thereby increasing a distance from the center 114 of the wheel 112 to the preselected feature 116 of the vehicle 104 and raising the body 110 of the vehicle 104/increasing the ground clearance of the body 110 at that wheel 112 location). Thus, the location of the axis "A" and the corresponding offset from the pivot point 408 may be selected based on desired leveling performance, within the constraints of the vehicle 104 design.

As shown in the figures, the rocker plate 406 may include various holes, connection points, fastener joints, or the like, ("holes" 428) arranged to couple a wheel 112 to the rocker plate 406. In various implementations, a wheel 112 mount or the like may be coupled to the rocker plate 406 using the holes 428. In one implementation, a final drive assembly (not shown) is coupled to the rocker plate 406 using the holes 428. The final drive assembly may receive input power from the transmission of the vehicle 104 through the drive component 410 at the pivot point 408, for example. An output of the final drive assembly may turn a wheel 112 coupled to the final drive assembly. In other embodiments, other wheel 112 mount and/or drive configurations may be used. In alternate embodiments, a track assembly, a runner assembly, an air castor assembly, or the like, may be used in place of the wheel 112 of the vehicle 104.

As shown in the figures, the leveling arrangement 402 may include an actuator 412. For example, a hydraulic, pneumatic, electric, etc. cylinder, or the like, may be arranged to pivot the rocker plate 406 with respect to the support plate 404, about the pivot point 408. In various implementations, the actuator 412 may be arranged to pivot the rocker plate 406 in response to a leveling signal 108, and to a degree (e.g., magnitude, amount, portion, etc.) indicated by a property (e.g., a magnitude, a frequency, content, an analog or digital code, etc.) of the leveling signal 108.

For example, the leveling signal 108 may be received by a control component (e.g., hydraulic control, etc., not shown) for the leveling arrangement 402 at the wheel 112 position. In various implementations, each wheel 112 position may have its own dedicated control component, or two or more wheel 112 positions may share a common control component. The leveling signal 108 may indicate a portion or degree of desired adjustment to the vertical distance of the center 114 of the wheel 112 from the preselected feature 116 at that wheel 112 position. In response, the control component may increase or decrease fluid pressure, for example, to the actuator 412, causing the actuator 412 to extend or retract by a corresponding amount. The extension or retraction of the actuator 412 thereby pivots the rocker plate 406 about the pivot point 408, changing the location (including the height, for example) of the wheel 112 at that wheel 112 position.

In an implementation, where the actuator 412 is a cylinder, or the like, the actuator 412 may include a rod 414 that extends or retracts from the actuator 412 when the actuator 412 is activated (e.g., when hydraulic fluid pressure changes within the actuator 412). In various embodiments, as shown in the figures, the leveling arrangement 402 may include a free link 416 pivotally coupled (at end 418) to the end of the actuator rod 414. In an implementation, the other end 420 of the free link 416 may be pivotally coupled to the rocker plate 406. Accordingly, the free link 416 couples the actuator 412 to the rocker plate 406.

In various embodiments, the free link 416 is arranged to lengthen the rotation of the rocker plate 406 beyond the reach of the actuator rod 414, when the actuator 412 is extended at least a preset length. Based on the free link 416, the rotation of the rocker plate 406 and the actuator 412 action may have multiple stages of rotation or extension.

For example, as shown in FIGS. 4 and 5, the actuator 412 is illustrated in a retracted position (at FIG. 4, e.g., for the lowered leveling state) or a partially extended position (at FIG. 5, e.g., for the neutral leveling state). In these positions, the free link 416 is held tightly against a surface of the rocker plate 406, due to the geometry of the leveling arrangement 402, for example, and acts as an "extension" of the rocker plate 406. In these positions, the actuator rod 414 can be considered to be coupled to the rocker plate 406 at the location of the "extension" (i.e., at the end 418 of the free link 416). Extending or retracting the actuator rod 414 within this range described may be referred to as a first stage of rotation or extension, and describes an arc based on the travel of the end 418 and the rocker plate 406.

As shown in FIG. 6, the actuator 412 is illustrated in an extended position (e.g., for the raised leveling state). In this position, the free link 416 has been pulled away from the surface of the rocker plate 406, at the end 418, by the actuator rod 414. Since the other end 420 of the free link 416 is coupled to the rocker plate 406, the rotation of the rocker plate 406 is lengthened through an additional arc, based on the length of the free link 416 and the length of the actuator rod 414. In other words, the rocker plate 406 is not rotated from the "extension" location (418) anymore, but is pulled from another point 420 on the rocker plate 406, that is behind the "extension" point 418. The point 420 on the rocker plate 406 may be determined by the length of the free link 416, for example.

Extending or retracting the actuator rod 414 within the range from the point where the free link 416 is pulled away from the surface of the rocker plate 406 to the full extension of the actuator rod 414 may be referred to as another stage of rotation or extension, and describes another arc based on the travel of the ends 418 and 420 and the rocker plate 406. In various alternate embodiments, other free link designs may be used to implement other stages of rotation and extension, and provide additional rotation to the rocker plate 406.

In an embodiment, as shown in the figures, the leveling arrangement 402 may include a guide plate 422 coupled to the support plate 404, for example, and arranged to guide an action of the actuator 412 through multiple stages of extension. For example, the guide plate 422 may include one or more grooves 424 arranged to guide the travel of the end of the actuator rod 414 (and also the end 418 of the free link 416) through the multiple stages of extension. In various implementations, the grooved guide plate 422 provides stability to the movement of the actuator rod 414 and the free link 416.

In further implementations, the grooved guide plate 422 defines the arcs and or limits of the actuator 412 and rocker plate 406 actions. For example, the groove 424 may include one or more arcs and one or more stops 426, or the like.

Figure 9:
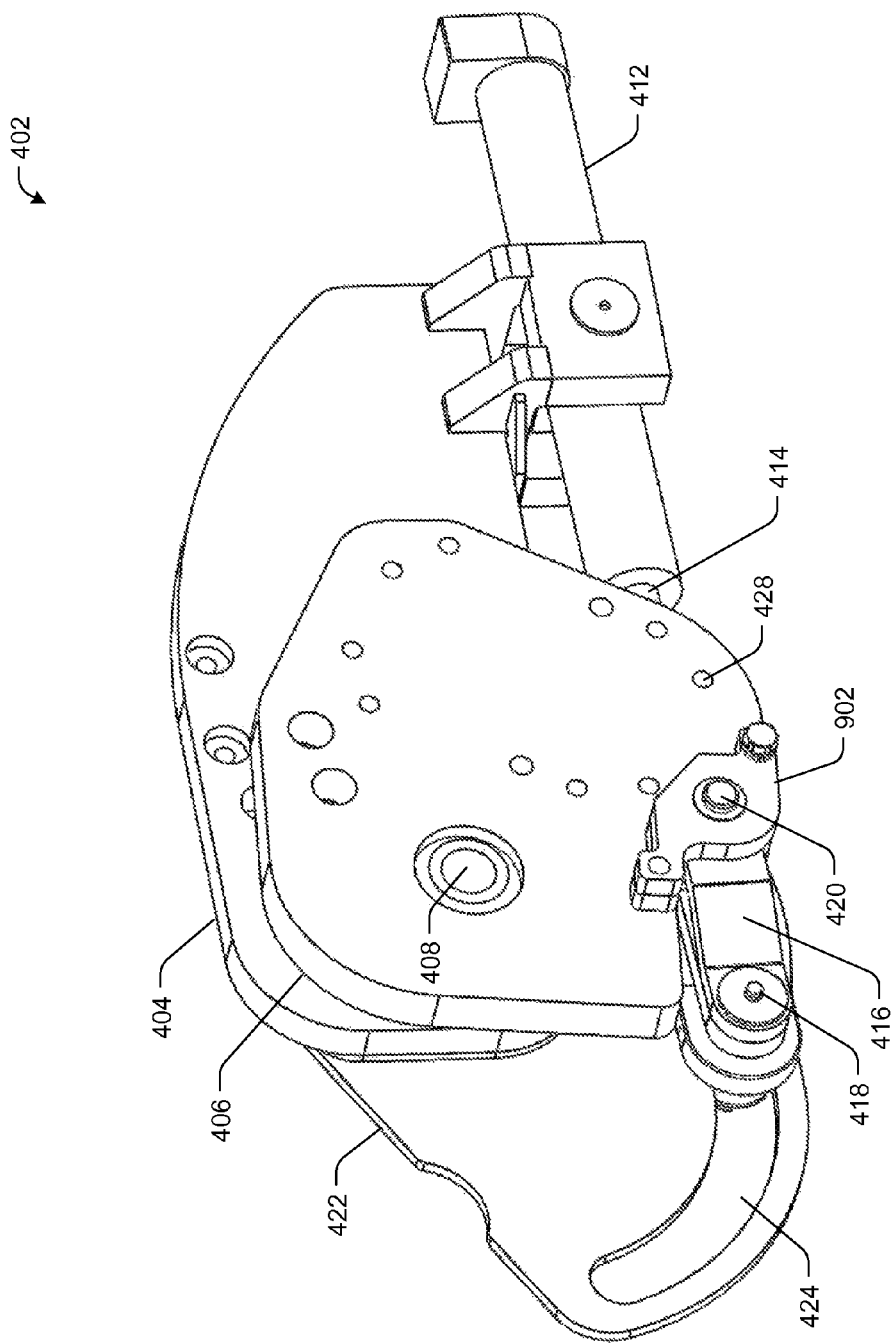
FIG. 9 is another perspective view of an example leveling arrangement, according to an embodiment.
Figure 10:
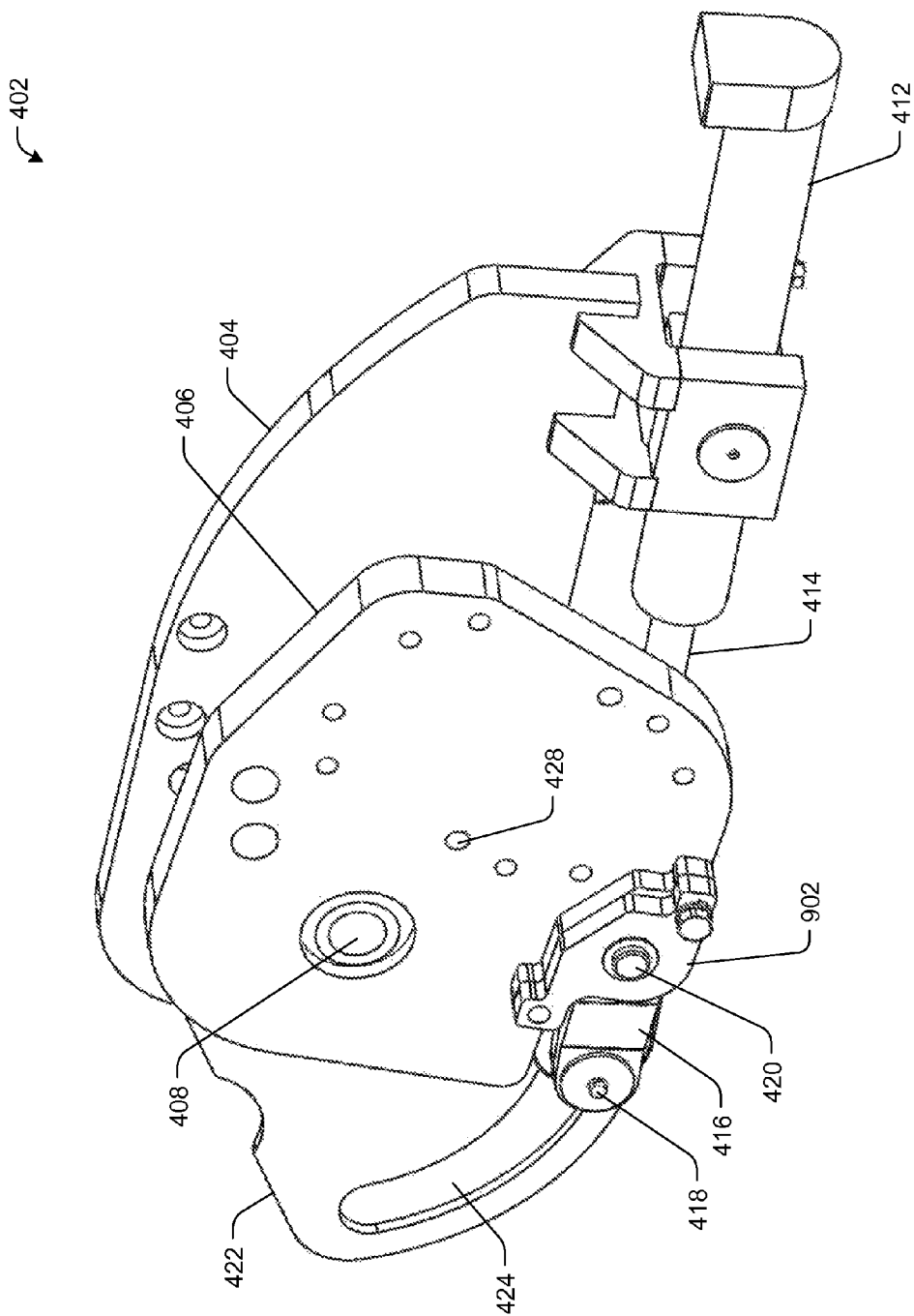
FIG. 10 is another perspective view of an example leveling arrangement, according to an embodiment.

Referring to FIGS. 9 and 10, in various embodiments, the leveling arrangement 406 may include one or more cap plates 902 coupled to the rocker plate 406. In the embodiments, the cap plate(s) 902 are arranged to cap the rocker plate end 420 of the free link 416, ensuring that the pin located at end 420 stays in place and providing support at the end 420. In an implementation, the pin at 420 runs through the free link 416 and the rocker plate 406, providing a pivot for the free link 416.

In various implementations, the free link 416 provides a positive mechanical advantage to the actuator 412 in pivoting the rocker plate 406 through a full range of action of the actuator 412. For instance, the free link 416 amplifies the force applied by the actuator 412, based on being in a condition of leverage in all positions. Since the free link 416 provides a greater mechanical advantage in rotating the rocker plate 406 over the actuator 412 alone, a smaller actuator 412 may be used to perform the rotation work, for example.

By way of illustration, three points that describe the leverage of the pivot action include the point where the actuator 412 is coupled to the frame or support plate 404, the pivot point 408, and the point 418 or point 420 (when the actuator 412 extended) where the actuator 412 (and free link 416) attach to the rocker plate 406. Mechanical advantage is at the least (or not present) if the three points are collinear (e.g., 180 degrees). At any other angle, some positive mechanical advantage may be present. Mechanical advantage is greatest when the three points form approximately a 90 degree angle (as seen in FIG. 5).

As shown in the figures, the three points do not approach a collinear situation throughout the range of action. At one extent, with the actuator 412 fully retracted, as shown in FIG. 4, the angle described by the three points is approximately 120 degrees. As the actuator 412 extends, the angle decreases towards 90 degrees, increasing in mechanical advantage. At the other extent, with the actuator fully extended, as shown in FIG. 6, the angle described by the three points is approximately 30 degrees. As the actuator 412 retracts, the angle increases toward 90 degrees, increasing in mechanical advantage. Thus, due to the free link 416, a positive mechanical advantage is present throughout the entire range of action.

Figure 14:
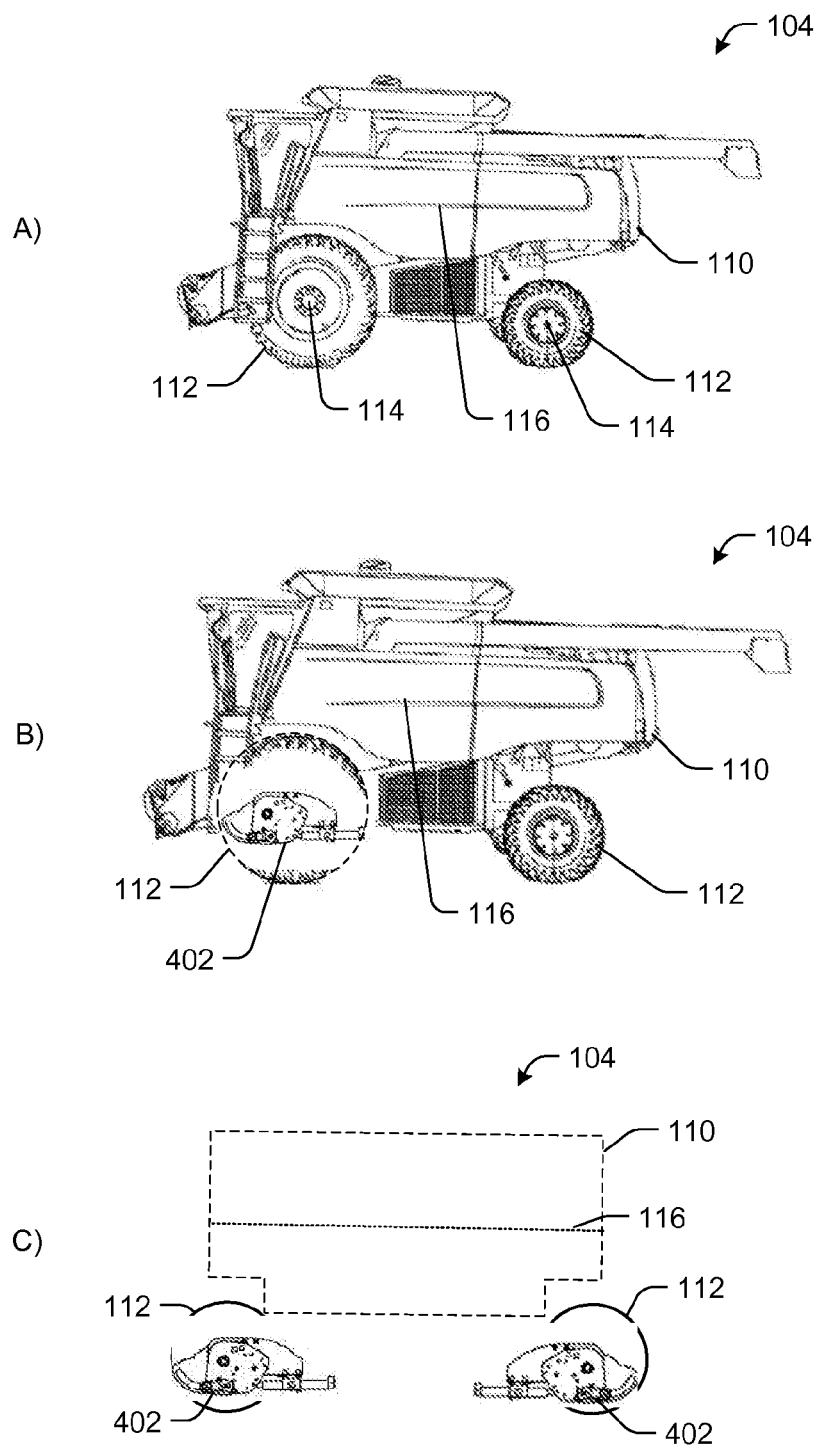
FIG. 14 shows example implementations of a leveling system with respect to a vehicle, according to an embodiment.

Referring to FIG. 14, a leveling arrangement 402 may be coupled to the vehicle 104 at one or more wheel 112 locations of the vehicle 104. For example, the upper diagram "A)" of FIG. 14 shows an illustration of an example combine harvester vehicle 104 wherein a leveling arrangement 402 may be applied. For the example vehicle 104, the preselected feature 116 of the vehicle 104 is a midline of the vehicle 104. As mentioned above, the midline feature 116 is above the center 114 of each of the wheels 112 of the vehicle 104. In alternate implementations, other features of the vehicle 104, including features of the body 110, chassis, frame, and so forth, may comprise the preselected feature 116.

In various implementations, as shown in the center diagram "B)" of FIG. 14, one or more leveling arrangements 402 may be coupled to the vehicle 104 at one or more wheel 104 locations. In alternate implementations, leveling arrangements 402 may be installed at only front wheel 112 locations or rear wheel 112 locations. For example, as shown at diagram B), leveling arrangements 402 may be coupled to the vehicle 104 at a front (fore) position, allowing the vehicle 104 to be leveled fore-and-aft or side-to-side (e.g., port-to-starboard) based on the leveling arrangements 402 installed at the fore position. In an alternate implementation, the leveling arrangements 402 are coupled to the vehicle 104 at an aft position (e.g., when the vehicle is steered from the fore wheel positions, and driven from the aft wheel positions, for instance).

In alternate implementations, as shown in the lower diagram "C)" of FIG. 14, one or more leveling arrangements 402 may be coupled to a vehicle 104 at one or more wheel 112 locations. For example, as shown in diagram C) of FIG. 14, a leveling arrangement 402 is installed at each of the four (or more) wheel 112 locations, allowing the vehicle 104 to be leveled fore-and-aft or side-to-side (e.g., port-to-starboard) based on the leveling arrangements 402 installed at the multiple wheel 112 positions. In some implementations, a leveling arrangement 402 may be installed at one wheel 112 location, or at multiple wheel 112 locations.

The positioning of the leveling arrangements 402 in the illustrations of FIG. 14 are examples and not intended to be limiting. In various examples, the leveling arrangements) 402 may be coupled to a frame of the vehicle 104, a portion of the body 110 of the vehicle 104, a chassis of the vehicle 104, or the like. Further, the leveling arrangements) 402 may be positioned as desired with respect to the vehicle 104 to accomplish the desired leveling while accommodating various features and components of the vehicle 104.

In various implementations, the leveling arrangement 402 is configured to be a field-installed kit. For example, the leveling arrangement 402 may be added to an existing vehicle 104, to provide leveling capability to the existing vehicle 104. In other words, one or more leveling arrangements 402 may be retro-fitted to one or more wheel 112 positions of an existing vehicle 104. In an example, wheel 112 components may be removed from one or more wheel 112 positions of the vehicle 104, and a leveling arrangement 402 installed at the wheel 112 position. The wheel 112 and some or all of the wheel 112 components may be coupled to the leveling arrangement 402.

In an implementation, the leveling arrangement 402 may be retro-fitted (e.g., kitted) to a wheel 112 position of a vehicle while maintaining all or many of the wheel 112 position components and/or hardware. For example, the final drive unit at a wheel 112 location of a vehicle 104 may be used with the leveling arrangement 402. Further, one or more drive shafts and the like may also be used, with some modification in some embodiments.

Representative Process

Figure 15:
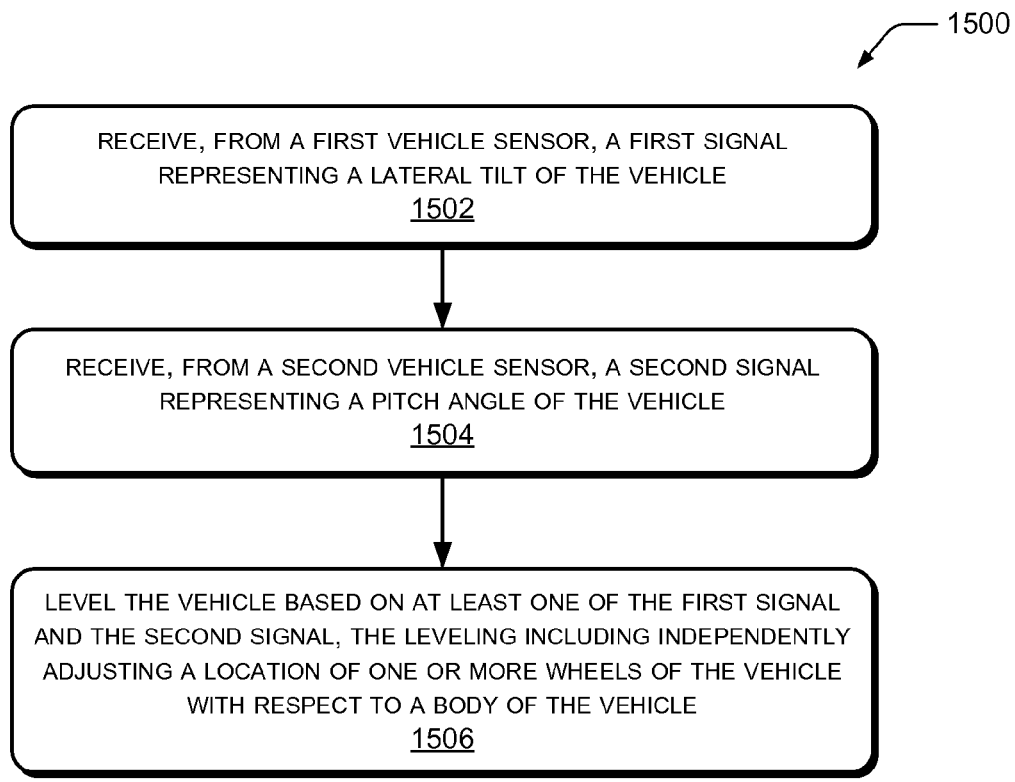
FIG. 15 is a flow diagram illustrating an example leveling process, according to an implementation.

FIG. 15 illustrates a representative process 1500 for implementing techniques and/or devices relative to leveling a vehicle (such as vehicle 104, for example). The process 1500 may also include receiving signals from remote or local sensors, and leveling the vehicle based on the signals received. The example process 1500 is described with reference to FIGS. 1-14.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 1502, the process includes receiving, from a first vehicle sensor (such as sensor 206, for example), a first signal representing a lateral tilt of the vehicle. At block 1504, the process includes receiving, from a second vehicle sensor (such as sensor 208, for example), a second signal representing a pitch angle of the vehicle.

In an implementation, the process includes generating a plurality of different leveling signals (such as leveling signals 108, for example). In the implementation, each of the different leveling signals of the plurality is based on at least the first signal and the second signal, and each of the plurality of different leveling signals is generated for a different wheel position of the vehicle. In an alternate embodiment, the leveling signals are generated based on other sensor signals as well.

At block 1506, the process includes leveling the vehicle (via a leveling arrangement 402, for example) based on at least one of the first signal and the second signal. In the implementation, the leveling includes independently adjusting a location of one or more wheels of the vehicle with respect to a body of the vehicle. In one implementation, the process includes receiving a different leveling signal at each of a plurality of leveling arrangements (such as leveling arrangements 402, for example), and leveling the vehicle via the plurality of leveling arrangements. In the implementation, the one or more wheels of the vehicle are each individually coupled to a leveling arrangement.

In an implementation, the process includes leveling the vehicle longitudinally and laterally based on the vehicle traversing sloped terrain having a longitudinal slope component and a lateral slope component. In the implementation, this is accomplished by independently adjusting a height (e.g., location) of each of the wheels at each of the wheel positions via a leveling arrangement at each wheel position.

In an implementation, the process includes pivoting one or more offset rocker plates (such as rocker plates 406, for example) with respect to the body of the vehicle in response to the first signal and/or the second signal. For example, the one or more wheels of the vehicle are individually coupled to the one or more offset rocker plates. In an embodiment, the offset rocker plates are pivotally coupled to the body of the vehicle, via a support plate (such as support plate 404, for example). In the embodiment, the support plate is fixed to a chassis, frame, or portion of the body of the vehicle.

In an implementation, the process includes adjusting a vertical distance of a center of the one or more wheels of the vehicle from a preselected feature (such as preselected feature 116, for example) of the vehicle. In the implementation, the preselected feature includes one of a portion of the body of the vehicle, a portion of a frame of the vehicle, a portion of a chassis of the vehicle, or the like.

In an implementation, the process includes concurrently increasing a vertical distance of a first quantity of wheels of the vehicle from the preselected feature of the vehicle and/or concurrently decreasing a vertical distance of a second quantity of wheels of the vehicle from the preselected feature of the vehicle. In various implementations, the first quantity of wheels is located at a fore end of the vehicle and the second quantity of wheels is located at an aft end of the vehicle. In various other implementations, one wheel of the first quantity of wheels is located at a fore end of the vehicle and another wheel of the first quantity of wheels is located at an aft end of the vehicle, and one wheel of the second quantity of wheels is located at a fore end of the vehicle and another wheel of the second quantity of wheels is located at an aft end of the vehicle.

Accordingly, pairs or groups of wheels may be adjusted together to level the vehicle. For example, some wheels may be raised while other wheels are lowered. Also, some wheels may be adjusted while other wheels are maintained in position. Having independent control of adjustment at each wheel location allows these and other combinations of wheel adjustment to be automatically or manually performed to level the vehicle (or for transportation of the vehicle, etc.).

In alternate implementations, other techniques may be included in the process in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention. Further, individual features of various embodiments may be combined to form other embodiments not specifically described.

What is claimed is:

1. A leveling arrangement for a vehicle, comprising:
   a support plate coupled to a frame of the vehicle;
   a rocker plate rotationally coupled to a wheel of the vehicle at a first rotational axis and pivotally coupled to the support plate at a pivot point, the pivot point offset a preset distance from the first rotational axis;
   an actuator arranged to pivot the rocker plate with respect to the support plate about the pivot point in response to a leveling signal; and
   a free link pivotally coupled to the actuator at a first end of the free link and pivotally coupled to the rocker plate at a second end of the free link, and arranged to lengthen a rotation of the rocker plate when the actuator is extended at least a preset length.

2. The leveling arrangement of claim 1, further comprising a leveling module arranged to output the leveling signal in response to receiving a first vehicle sensor signal representing a lateral tilt of the vehicle or a second vehicle sensor signal representing a pitch angle of the vehicle.

3. The leveling arrangement of claim 1, further comprising a control component arranged to receive the leveling signal and to cause the actuator to pivot the rocker plate with respect to the support plate an amount as represented by a property of the leveling signal.

4. The leveling arrangement of claim 1, wherein the free link provides a positive mechanical advantage to the actuator in pivoting the rocker plate throughout a full range of action of the actuator.

5. The leveling arrangement of claim 1, wherein the actuator adjusts a distance of a center of the wheel from a preselected feature of the vehicle and adjusts a ground clearance of the vehicle at the wheel, via pivoting the rocker plate with respect to the support plate.

6. The leveling arrangement of claim 1, wherein the leveling arrangement is configured to be field-installed on an existing vehicle, the field-installation using drive components of the existing vehicle.

7. The leveling arrangement of claim 1, further comprising a grooved guide plate coupled to the support plate and arranged to guide an action of the actuator through multiple stages of extension, the free link arranged to lengthen the rotation of the rocker plate during one or more stages of the multiple stages.

8. The leveling arrangement of claim 7, wherein a length of the free link is held against the rocker plate and not allowed to pivot during one or more other stages of the multiple stages and the free link is allowed to pivot with respect to the rocker plate during the one or more stages of the multiple stages, the free link lengthening the rotation of the rocker plate when allowed to pivot with respect to the rocker plate.

9. The leveling arrangement of claim 8, wherein the rocker plate is rotated by the actuator from a first point on the rocker plate during the one or more stages of the multiple stages and the rocker plate is rotated by the actuator from a second point on the rocker plate during the one or more other stages of the multiple stages.

10. A leveling system for a vehicle, comprising a plurality of the leveling arrangements of claim 1, and a processor/controller arranged to independently control each said leveling arrangement of the plurality of leveling arrangements.

11. The leveling system of claim 10, wherein each said leveling arrangement of the plurality of leveling arrangements of claim 1 is coupled to a different wheel position of the vehicle.

12. The leveling system of claim 11, wherein each said wheel position of the vehicle includes a leveling arrangement of claim 1.

13. The leveling system of claim 11, wherein each said leveling arrangement of the plurality of leveling arrangements of claim 1 is arranged to independently adjust a vertical distance of a wheel of the vehicle from a preselected feature of the vehicle.

14. The leveling system of claim 13, wherein the preselected feature comprises a portion of a body of the vehicle or a portion of a frame of the vehicle.

* * * * *